United States Patent
Kim

[11] Patent Number: 5,960,860
[45] Date of Patent: Oct. 5, 1999

[54] WATER TEMPERATURE CONTROL DEVICE IN COOLING SYSTEM OF WATER COOLING TYPE ENGINE

[75] Inventor: Jung-Shik Kim, Kyungsangnam-do, Rep. of Korea

[73] Assignee: Hyundai Motor Company, Rep. of Korea

[21] Appl. No.: 08/957,761

[22] Filed: Oct. 24, 1997

[30] Foreign Application Priority Data

Oct. 26, 1996 [KR] Rep. of Korea ............... 96-48870

[51] Int. Cl.[6] ............................................ F01P 3/00
[52] U.S. Cl. ..................... 165/51; 236/34; 236/34.5; 123/41.08; 123/41.17
[58] Field of Search ............... 165/51; 236/34, 236/34.5; 123/41.08, 41.02, 41.16, 41.17

[56] References Cited

U.S. PATENT DOCUMENTS

| | | | |
|---|---|---|---|
| 3,809,150 | 5/1974 | Holmes | 165/51 |
| 3,893,618 | 7/1975 | Wong et al. | 236/34.5 |
| 3,946,943 | 3/1976 | Hattori | 236/34.5 |
| 4,006,775 | 2/1977 | Avrea | 165/51 |
| 4,288,031 | 9/1981 | Hass | 236/34.5 |
| 4,347,973 | 9/1982 | Jackson | 236/34.5 |
| 4,524,907 | 6/1985 | Wong | 236/34.5 |
| 4,562,953 | 1/1986 | Duprez et al. | 236/34.5 |
| 4,759,401 | 7/1988 | Pfouts et al. | 165/51 |
| 4,883,225 | 11/1989 | Kitchens | 236/34.5 |
| 4,976,462 | 12/1990 | Hirata et al. | 236/34.5 |
| 4,978,060 | 12/1990 | Stahly | 236/34.5 |
| 5,018,664 | 5/1991 | Butler | 236/34.5 |
| 5,123,591 | 6/1992 | Reynolds | 236/34.5 |
| 5,163,613 | 11/1992 | Ragan | 236/34.5 |
| 5,238,185 | 8/1993 | Saur et al. | 236/34.5 |
| 5,282,828 | 2/1994 | Ragan | 236/34.5 |
| 5,503,329 | 4/1996 | Saladino | 236/34.5 |

*Primary Examiner*—Ira S. Lazarus
*Assistant Examiner*—Terrell McKinnon
*Attorney, Agent, or Firm*—Christie, Parker & Hale, LLP

[57] ABSTRACT

This invention relates to a water temperature control device for a cooling system having a reduced number of parts. The water temperature control device circulates cooling water to a water pump through either a radiator or a bypass line depending on the temperature of the cooling water from the water jacket of automobile engine. The water temperature control device provides an improved thermostat seal and prevents piston release of a pellet assembly. The invention comprises a water temperature control device having a case main body formed with a cooling water inlet, a cooling water outlet and a bypass outlet. A valve means is elastically mounted by a spring supported to a frame within the interior of the case main body. A dome type bridge, which holds a front end of the piston of the thermostat, is formed at the interior of the water cooling outlet of the case main body. The front end portion is passed through a pierced hole at the bridge top portion. A calking portion is attached to the front end portion of the piston to prevent release from the dome type bridge during thermostat operation.

13 Claims, 3 Drawing Sheets

WATER TEMPERATURE CONTROL DEVICE IN COOLING SYSTEM OF WATER COOLING TYPE ENGINE

BACKGROUND OF THE INVENTION

The present invention relates to a water temperature control device for a cooling system with a reduced number of parts for circulating cooling water to a water pump through either a radiator or bypass line depending on the water temperature of the cooling water from the water jacket of an automobile engine, and which has improved thermostat sealing capability as well as means for preventing pellet assembly piston release.

In general, a cooling system of an engine comprises a water pump at an inlet side of a water jacket provided within cylinder head and cylinder block. A thermostat positioned at an outlet side of the water jacket is used as a water temperature control device. The water temperature control device detects the water temperature of the cooling water from the water jacket and controls the flow direction of the cooling water.

A conventional water temperature control system 100, as shown in FIG.3, is assembled with a case main body 101 and a case cover 102. The case main body 101 includes a cooling water inlet 103 connected to the outlet of the water jacket, and a bypass outlet 104 for passing the cooling water to the water pump. The case cover 102 includes a cooling water outlet 105 for supplying the cooling water to a radiator.

A thermostat 106 is mounted to the case main body 101. The thermostat comprises a dome type seat 109 supported by a seal portion 108 with a sealing member 107 interposed between the case main body 101 and the case cover 102. A valve means 112, elastically supported by a spring 111 to a frame 110, is located within interior of the case main body 101. A piston 113 extending from a pellet assembly 114 is positioned in a recessed portion 109a of the dome type seat 109.

With the conventional water temperature control system 100, the thermostat 106 opens and closes in response to the water temperature of the cooling water by the forcing of the piston 113 out of the pellet assembly 114 and against the recessed portion 109a. This approach, however, has resulted in the release of the piston 113 from the recessed portion 109a due to vibration from the water pressure and the like, degrading the sealing characteristics of the thermostat 106. Moreover, the assembly of the device is difficult because the conventional water temperature control device has numerous parts.

OBJECT AND SUMMARY OF THE INVENTION

The present invention is directed to solving the problems associated with the sealing characteristics of conventional thermostats of water temperature control devices.

It is, therefore, an object of the present invention to provide a water temperature control device in a cooling system for water cooling type engines in which a thermostat piston is more securely engaged with the water temperature control device, and which automatically controls the circulation path of cooling water in accordance with the water temperature, so that the piston is immune to vibration to prevent erroneous operation.

It is another object of the present invention to simplify the case main body of the water temperature control device and reduce the parts to decrease manufacturing cost.

In order to obtain the above objects, the present invention comprises a water temperature control device in which a case main body is formed with a cooling water inlet, a cooling water outlet and a bypass outlet. A valve means is elastically mounted by a spring supported to a frame within the interior of the case main body. A front end of a piston of a thermostat, which activates the valve means, is supported by a dome type bridge. The dome bridge is formed integrally with the case main body, and the cooling water outlet. At the top of the dome type bridge is a bridge top portion formed with a pierced hole for passing through the front end of the piston. A calking portion is attached to the front end of the piston passing through the bridge top portion to prevent the piston from releasing from the dome type bridge when the thermostat is operated.

The case main body is formed with inclined surface for stable seating of the valve body. The case main body is preferably a single body which improves the sealing capability of the thermostat. The main case body is also formed with a stably fixing recess at the cooling water inlet for assembly with the frame. This configuration improves ease of assembly.

DETAILED DESCRIPTION OF THE PREFERRED EMBODIMENTS

Hereinafter, a preferred embodiment of the present invention will be described in detail with reference to the accompanying drawings.

Figure 1:
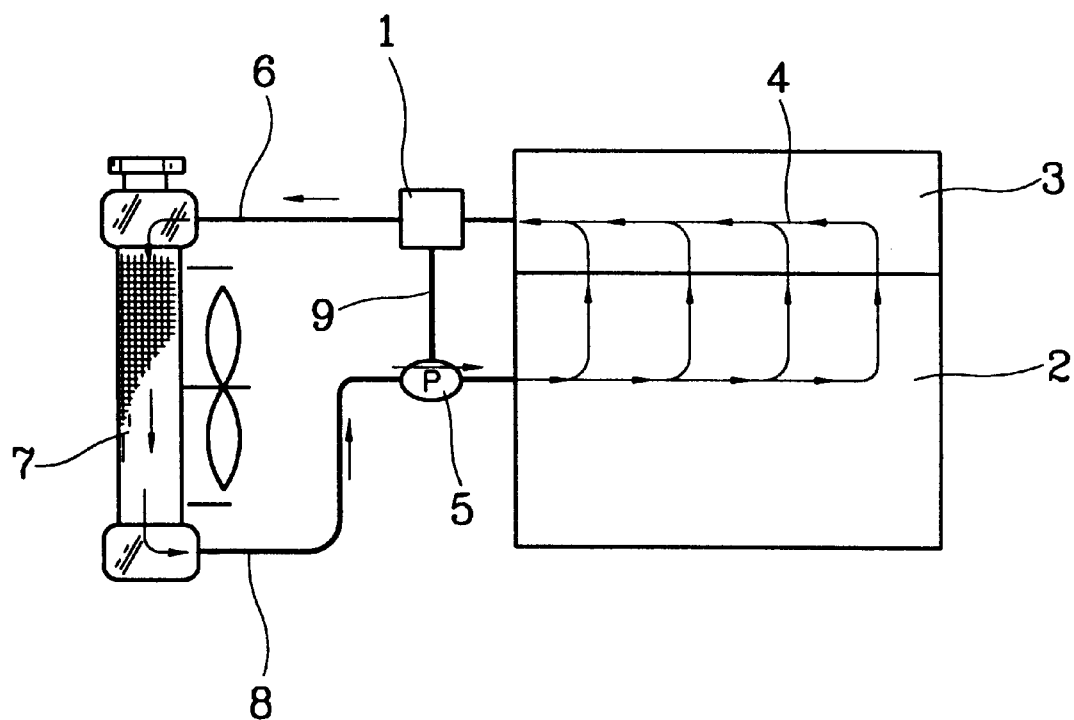
FIG. 1 is a schematic view of a cooling system of the present invention.
Figure 2:
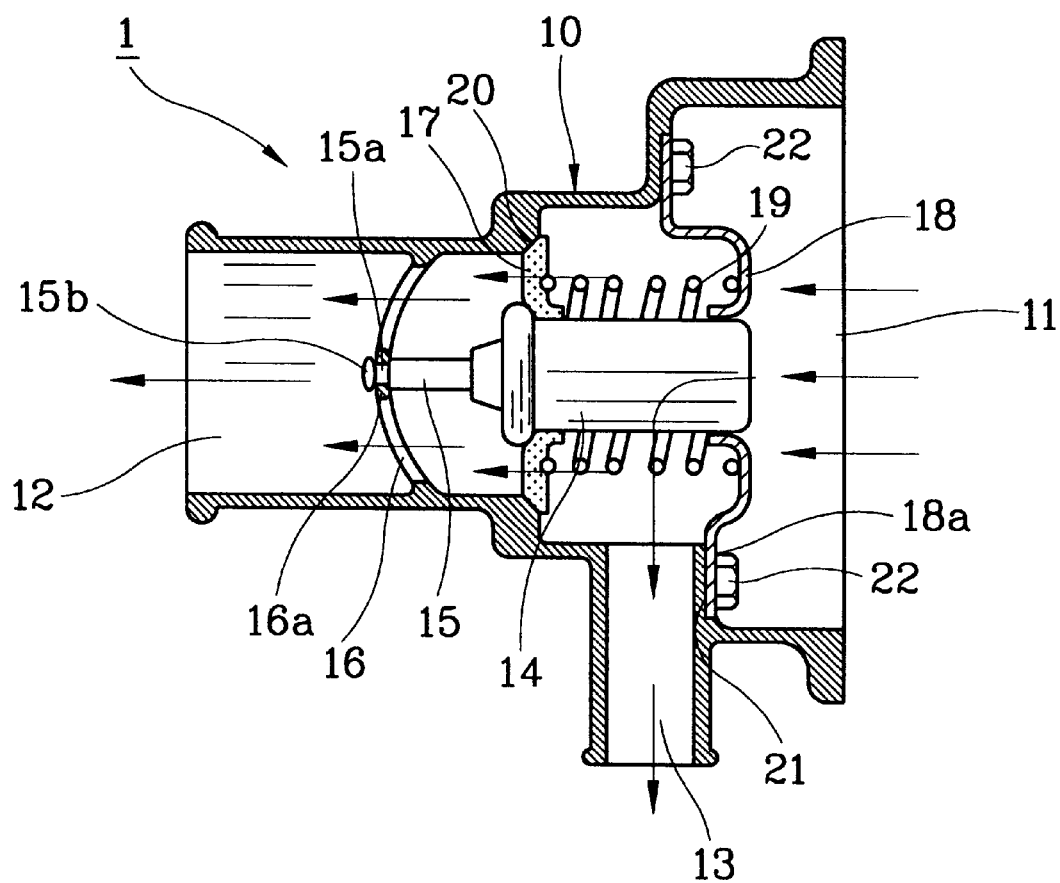
FIG. 2 is a detailed cross sectional view of an embodiment of a water temperature control device in accordance with the present invention.
Figure 3:
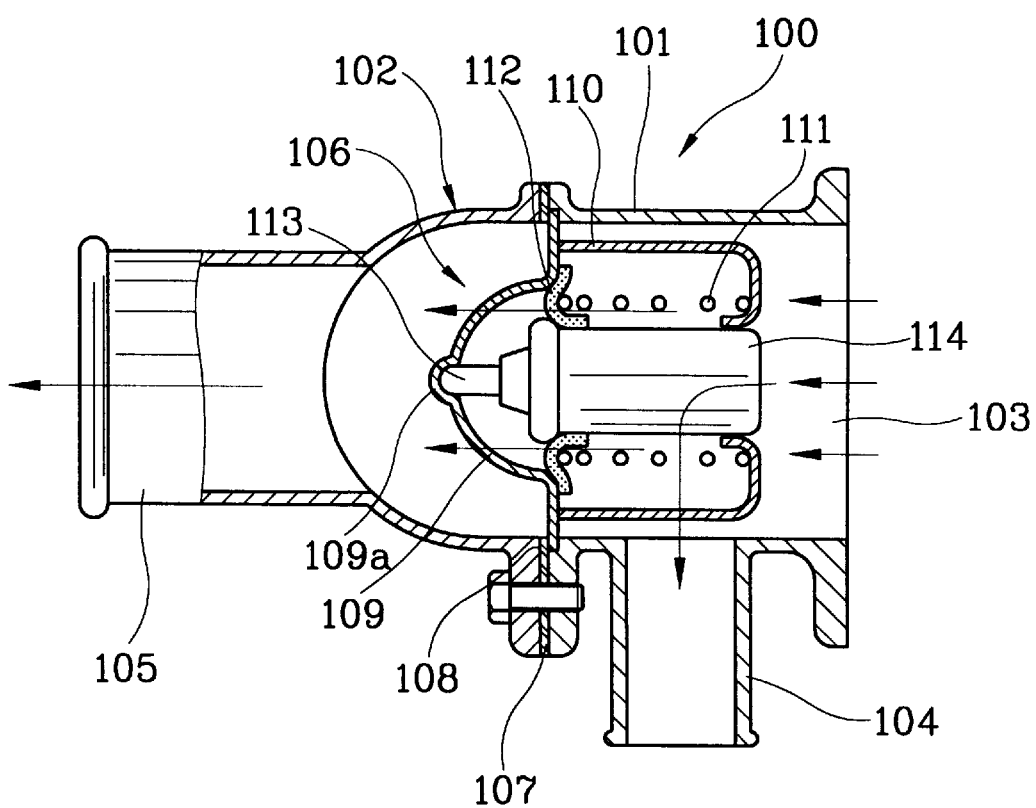
FIG. 3 is a detailed cross sectional view of a prior art water temperature control device.

FIG. 1 is a systematic view of a water temperature control device, and FIG. 2 shows a detailed cross sectional view of the device in accordance with a preferred embodiment of the present invention.

The water temperature control device 1 is mounted at an outlet of a water jacket 4 formed in a cylinder block 2 and cylinder head 3. A water pump 5 is mounted at an inlet of the water jacket 4.

The cooling water passed through the water temperature control device 1 is either directed to a radiator 7 through a cooling water supply line 6 before being circulated back to the water pump 5 through a cooling water returning line 8, or at initial start up when the engine is cold, is directed to a bypass line 9 and then circulated back to the water jacket 4.

The water temperature control device 1 includes a case main body 10 formed in a single body. The case main body 10 has a cooling water inlet connected to the outlet of the water jacket 4, a cooling water outlet 12 connected to the cooling water supply line 6, and a bypass outlet 13 connected to the bypass line 9.

A dome type bridge 16, which holds a front end portion 15a of a piston 15 of a thermostat 14, is formed at the interior of the cooling water outlet 12 of the case main body 10. The front end portion 15a of the piston is passed through a pierced through hole at the bridge top portion 16a of the dome type bridge 16 and formed with a calking portion 15b by a post-working process.

The thermostat 14 is supported by a valve body 17 and a frame 18 in the case main body 10. The valve body 17 is elastically mounted by spring 19 supported by the frame 18 for opening and closing an opening 20 on an inclined surface within the interior of the case main body 10. A stably fixing portion 18a on the frame 18 is fixed to a stably fixing recess 21 formed at the cooling water inlet 11, and fastened thereto by small bolts 22.

In operation, the thermostat 14 remains closed until the engine reaches operating temperature (about 80° C.–90° C.). When the thermostat 14 is closed, the cooling water from the outlet of the water jacket 4 is circulated to the water pump 5 through the bypass outlet 13. As the temperature increases, the thermostat 14 is operated to open the valve body 17. Since the front end portion 15a of the piston 15 of the thermostat 14 is inserted through the pierced through hole of the bridge top portion 16a of the dome type bridge 16 and firmly gripped by the calking portion 15b from its opposite side, the stability of the opening operation of the thermostat 14 is improved, and the opening clearance is more stable resulting in a smoother flow of cooling water.

Conversely, when the valve body 17, supporting the thermostat 14 by the elasticity of the spring 19, closes, the valve body is seated on the inclined surface of the opening 20 with greater stability thereby preventing the leakage of cooling water when the thermostat 14 is closed.

Additionally, since the stably fixing portion 18a of the frame 18 is inserted to the stably fixing recess 21 and then tightened by small bolts 22, the frame 18 can be correctly fixed to the proper location, thus providing ease of assembly.

In accordance with the present invention, the piston of the thermostat, which is mounted within interior of the water temperature control device 1 and controls the flowing path of the cooling water in accordance with the temperature of the cooling water, is fixed to the dome type bridge which is integrally formed with the case main body 10. This prevents the release of the piston under vibration, thereby allowing the thermostat 14 to operate based solely on the temperature of the cooling water. This increases the durability of the water temperature control device and extends its useful life. Moreover, since the present invention is formed with a unitary casing, the sealing members of the conventional dual casing devices are eliminated. This approach not only reduces the number of parts, thereby improving the ease of assembly, but also provides improved sealing capability of the thermostat because the inclined opening 20 is integrally formed with the single casing.

What is claimed is:

1. A water temperature control device for a cooling system in which a case main body is formed with a cooling water inlet, cooling water outlet and bypass outlet, a valve means elastically mounted by a spring supported to a frame within an interior of the case main body, and a front end of a piston of a thermostat activating valve means supported to a recessed portion of a dome type seat, the water temperature control device comprising:
    a dome bridge formed integrally with said case main body, and formed with the cooling water outlet;
    a bridge top portion having a pierced hole for passing through the front end portion of the piston to a top portion of said dome type bridge; and
    a calking portion for retaining the front end portion of the piston passing through the bridge top portion; whereby the piston is not released from the dome type bridge upon operating the thermostat.

2. A water temperature control device in a cooling system of a water cooling type engine as defined in claim 1 wherein said opening, integrally formed within an interior of the case main body, has an inclined surface becoming gradually narrower toward the cooling water outlet.

3. A water temperature control device in a cooling system of a water cooling type engine as defined in claim 1 wherein said frames guiding the thermostat and supporting the spring, comprises a stably fixing portion stably mounted to a stably fixing recess formed to the cooling water inlet side and tightened by small bolts.

4. A water temperature control device, comprising:
    a case main body;
    a thermostat having a piston extending therefrom, said piston having a front end portion;
    a dome bridge formed integrally with the case main body, said dome bridge having a top portion with a hole, said front end portion of the piston extending through the hole; and
    a calking portion attached to the front end portion of the piston for retaining the piston to the dome type bridge during thermostat operation.

5. The water temperature control device of claim 4 wherein the case main body comprises a unitary structure having a cooling water inlet, a cooling water outlet and a bypass outlet, and wherein said dome bridge is formed at the cooling water outlet of the case main body.

6. The water temperature control device of claim 5 further comprising a frame connected to the case main body, a spring supported by the frame, and a thermostat controlled valve elastically supported by the spring.

7. The water temperature control device of claim 6 wherein the case main body further comprises a valve seat having an inclined surface narrowing toward the cooling water outlet.

8. The water temperature control device of claim 5 wherein the case main body further comprises a recess formed at the cooling water inlet, and the frame comprises a fixing portion stably mounted to the recess of the case main body.

9. The water temperature control device of claim 8 further comprising a pair of bolts for stably mounting the fixing portion of the frame to the recess of the case main body.

10. A water temperature control device comprising:
    a case main body having a cooling water inlet, a cooling water outlet, a bypass outlet, and a recess comprising a stepped down surface having a diameter smaller than a diameter of the case main body adjacent the cooling water inlet;
    a dome type bridge integral with the case main body and adjacent the cooling water outlet, said dome type bridge having a bridge top portion with a hole;
    a valve seat having an inclined surface which becomes narrower toward the cooling water outlet, the valve seat being located between the dome type bridge and the stepped down surface;
    a piston having a front end portion extending through the hole in the dome type bridge;
    a thermostat supported by the piston and capable of moving toward the cooling water inlet during operation of the water temperature control device;
    a calking portion attached to the front end portion of the piston for retaining the piston to the dome type bridge during thermostat operation;
    a valve capable of moving toward the cooling water inlet together with the thermostat, and which opens and closes the valve seat;
    a frame connected to the stepped down surface of the case main body; and a spring having an end supported by the frame, said spring urging the valve to contact the valve seat.

11. A water temperature control device as defined in claim 1 further comprising a stably fixing recess defining a mounting position for the frame, said stably fixing recess comprising a stepped down surface on the case main body.

12. A water temperature control device as defined in claim 1 wherein each of the calking portion, the piston, and the hole in the bridge top portion comprise a diameter, wherein the diameter of the hole in the bridge top portion is smaller than both the diameter of the calking portion and the diameter of the piston.

13. A water temperature control device as defined in claim 4 wherein each of the calking portion, the piston, and the hole in the bridge top portion comprise a diameter, wherein the diameter of the hole in the bridge top portion is smaller than both the diameter of the calking portion and the diameter of the piston.

* * * * *